United States Patent
Geng et al.

(10) Patent No.: US 10,381,745 B2
(45) Date of Patent: Aug. 13, 2019

(54) BEAM FORMING NETWORK AND BASE STATION ANTENNA

(71) Applicant: Huawei Technologies Co., Ltd., Shenzhen (CN)

(72) Inventors: Yang Geng, Shanghai (CN); Guanxi Zhang, Xi'an (CN); Jianping Zhao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 289 days.

(21) Appl. No.: 15/416,941

(22) Filed: Jan. 26, 2017

(65) Prior Publication Data
US 2017/0141481 A1    May 18, 2017

Related U.S. Application Data (63) Continuation of application No. PCT/CN2014/083095, filed on Jul. 26, 2014.

(51) Int. Cl.
*H01Q 21/22*   (2006.01)
*H01Q 3/40*    (2006.01)
(Continued)

(52) U.S. Cl.
CPC ............ *H01Q 21/22* (2013.01); *H01Q 3/40* (2013.01); *H01Q 21/0037* (2013.01); *H04W 16/28* (2013.01)

(58) Field of Classification Search
CPC combination set(s) only.
See application file for complete search history.

(56) References Cited

U.S. PATENT DOCUMENTS 4,231,040 A * 10/1980 Walker .................... H01Q 3/40
                                                  342/373
5,812,088 A     9/1998 Pi et al.
(Continued)

FOREIGN PATENT DOCUMENTS

CN    102683897 A    9/2012
CN    102714805 A    10/2012
(Continued)

OTHER PUBLICATIONS

Sodin, "Method of Synthesizing a Beam-Forming Device for the N-Beam and N-Element Array Antenna, for any N," IEEE Transactions on Antennas and Propagation, vol. 60, No. 4, XP11440913, pp. 1771-1776, Institute of Electrical and Electronics Engineers, New York, New York (Apr. 2012).

(Continued)

*Primary Examiner* — Junpeng Chen
(74) *Attorney, Agent, or Firm* — Leydig, Voit & Mayer, Ltd.

(57) ABSTRACT

Embodiments of the present invention provide a beam forming network, including: a first 180-degree bridge for equal-power division, a 180-degree bridge for unequal-power division, a 90-degree phase shifter, and a second 180-degree bridge for equal-power division. A coupling port of a sum input port of the first 180-degree bridge for equal-power division is connected to a difference input port of the 180-degree bridge for unequal-power division, a straight-through port of the sum input port of the first 180-degree bridge for equal-power division is connected to an input port of the 90-degree phase shifter, an output port of the 90-degree phase shifter is connected to a difference input port of the second 180-degree bridge for equal-power division, and a straight-through port of a sum input port of the 180-degree bridge for unequal-power division is con- (Continued)

nected to a sum input port of the second 180-degree bridge for equal-power division.

7 Claims, 7 Drawing Sheets

(51) Int. Cl.
    *H01Q 21/00*     (2006.01)
    *H04W 16/28*     (2009.01)

(56)     References Cited

U.S. PATENT DOCUMENTS

| | | |
|---|---|---|
| 5,854,611 A | 12/1998 | Gans et al. |
| 9,941,587 B2* | 4/2018 | Wu .......................... H04Q 3/42 |
| 2010/0321238 A1 | 12/2010 | Shen |
| 2012/0068907 A1 | 3/2012 | Petersson et al. |
| 2013/0229308 A1* | 9/2013 | Pu .......................... H01Q 3/40 342/373 |
| 2013/0278460 A1 | 10/2013 | Ai et al. |
| 2013/0281159 A1* | 10/2013 | Ai .......................... H01Q 3/26 455/562.1 |
| 2015/0380817 A1 | 12/2015 | Wu |

FOREIGN PATENT DOCUMENTS

| | | |
|---|---|---|
| CN | 103414022 A | 11/2013 |
| CN | 203277650 U | 11/2013 |
| JP | H08330831 A | 12/1996 |
| JP | H0951235 A | 2/1997 |
| JP | 2013531434 A | 8/2013 |
| KR | 20130142105 A | 12/2013 |
| WO | WO 2010136063 A1 | 12/2010 |

OTHER PUBLICATIONS

Zhang et al., "Design and Implementation of a 3×3 Orthogonal Beam-Forming Network for Pattern-Diversity Applications," Progress in Electromagnetics Research C, vol. 53, XP55381894, pp. 19-26 (2014).

* cited by examiner

BEAM FORMING NETWORK AND BASE STATION ANTENNA

CROSS-REFERENCE TO RELATED APPLICATIONS

This application is a continuation of International Application No. PCT/CN2014/083095, filed on Jul. 26, 2014, the disclosure of which is hereby incorporated by reference in its entirety.

TECHNICAL FIELD

Embodiments of the present invention relate to the field of mobile communications technologies, and in particular, to a beam forming network and a base station antenna.

BACKGROUND

With a sharp increase of service traffic of mobile communication, operators and users of mobile communications networks have increasingly high requirements for network coverage and communication data traffic. Many types of base station antennas that are key components of a network emerge, and corresponding new technologies emerge accordingly. A multibeam antenna is one of these antennas.

A coverage area corresponding to a conventional single-beam antenna is only a wide-beam area. All user equipment in the area accesses a network by using a same beam, and a network capacity is limited. A multibeam antenna can simultaneously form multiple beams that are in different directions and are orthogonal to each other, and the different beams can cover different areas, which significantly improves network capacity. A multibeam antenna generally consists of two parts: a beam forming network (BFN) and an antenna array. The beam forming network is a feeding network matrix, having multiple input ports and multiple output ports. Each input port is referred to as a beam port. In a beam forming network, a digital or analog manner is used to establish an amplitude and phase relationship of multiple mappings between a signal of an input port and a signal of an output port. A beam forming network having N output ports is used as an example. When any input port receives a signal from a base station transceiver, the signal is mapped as N signals with particular amplitudes and phases at the N output ports (for example, N signals have a same amplitude, and have a linear relationship in phase), and the N output ports feed an antenna array to form a beam.

A representative beam forming network is a Butler matrix. However, a Butler matrix has a complex structure and is difficult to fabricate.

SUMMARY

In view of this, embodiments of the present invention provide a beam forming network and a base station antenna, which have a simple structure and are easy to fabricate.

According to a first aspect, a beam forming network is provided, including a first 180-degree bridge for equal-power division, a 180-degree bridge for unequal-power division, a 90-degree phase shifter, and a second 180-degree bridge for equal-power division, where the first 180-degree bridge for equal-power division, the 180-degree bridge for unequal-power division, and the second 180-degree bridge for equal-power division separately have a sum input port, a difference input port, a straight-through port of the sum input port, and a coupling port of the sum input port, where the coupling port of the sum input port of the first 180-degree bridge for equal-power division is connected to the difference input port of the 180-degree bridge for unequal-power division, the straight-through port of the sum input port of the first 180-degree bridge for equal-power division is connected to an input port of the 90-degree phase shifter, an output port of the 90-degree phase shifter is connected to the difference input port of the second 180-degree bridge for equal-power division, and the straight-through port of the sum input port of the 180-degree bridge for unequal-power division is connected to the sum input port of the second 180-degree bridge for equal-power division; and two input ports of the first 180-degree bridge for equal-power division and the sum input port of the 180-degree bridge for unequal-power division are configured to receive a signal from a base station transceiver, and the coupling port of the sum input port of the 180-degree bridge for unequal-power division and two output ports of the second 180-degree bridge for equal-power division are configured to feed an antenna array.

In a first possible implementation manner of the first aspect, a power division ratio of the 180-degree bridge for unequal-power division is 1:2 or 1:4.

With reference to the first aspect or the first possible implementation manner of the first aspect, in a second possible implementation manner, the beam forming network further includes a first power divider and a second power divider, where the straight-through port of the sum input port of the second 180-degree bridge for equal-power division is connected to an input port of the first power divider, the coupling port of the sum input port of the second 180-degree bridge for equal-power division is connected to an input port of the second power divider, the first power divider and the second power divider separately have two output ports, and the output ports of the first power divider and the second power divider are configured to feed the antenna array.

With reference to the second possible implementation manner of the first aspect, in a third possible implementation manner, power division ratios of the first power divider and the second power divider are 3:7, and the power division ratio of the 180-degree bridge for unequal-power division is 1:2.

With reference to the first aspect or the first possible implementation manner of the first aspect, in a fourth possible implementation manner, the beam forming network further includes a first power divider, a second power divider, and a third power divider, where the straight-through port of the sum input port of the second 180-degree bridge for equal-power division is connected to an input port of the first power divider, the coupling port of the sum input port of the second 180-degree bridge for equal-power division is connected to an input port of the second power divider, the coupling port of the sum input port of the 180-degree bridge for unequal-power division is connected to an input port of the third power divider, the first power divider, the second power divider, and the third power divider separately have two output ports, and the output ports of the first power divider, the second power divider, and the third power divider are configured to feed the antenna array.

With reference to the fourth possible implementation manner of the first aspect, in a fifth possible implementation manner, power division ratios of the first power divider and the second power divider are both 1:4, a power division ratio of the third power divider is 1:1, and the power division ratio of the 180-degree bridge for unequal-power division is 1:2.

According to a second aspect, a base station antenna is provided, including the beam forming network provided in the foregoing aspect and an antenna array, where the antenna array includes multiple linear arrays, each linear array includes at least one antenna unit, and each output port of the beam forming network feeds one of the linear arrays.

According to exemplary embodiments of the present invention, a base station antenna can form three fixed beams, and the beam forming network has a simple structure and is easy to fabricate.

DESCRIPTION OF EMBODIMENTS

Embodiments of the present invention provide a beam forming network that uses a 180-degree bridge as a major component. The beam forming network has a simple structure and is easy to fabricate, and enables a base station antenna to simultaneously generate three beams in different directions.

Figure 1:
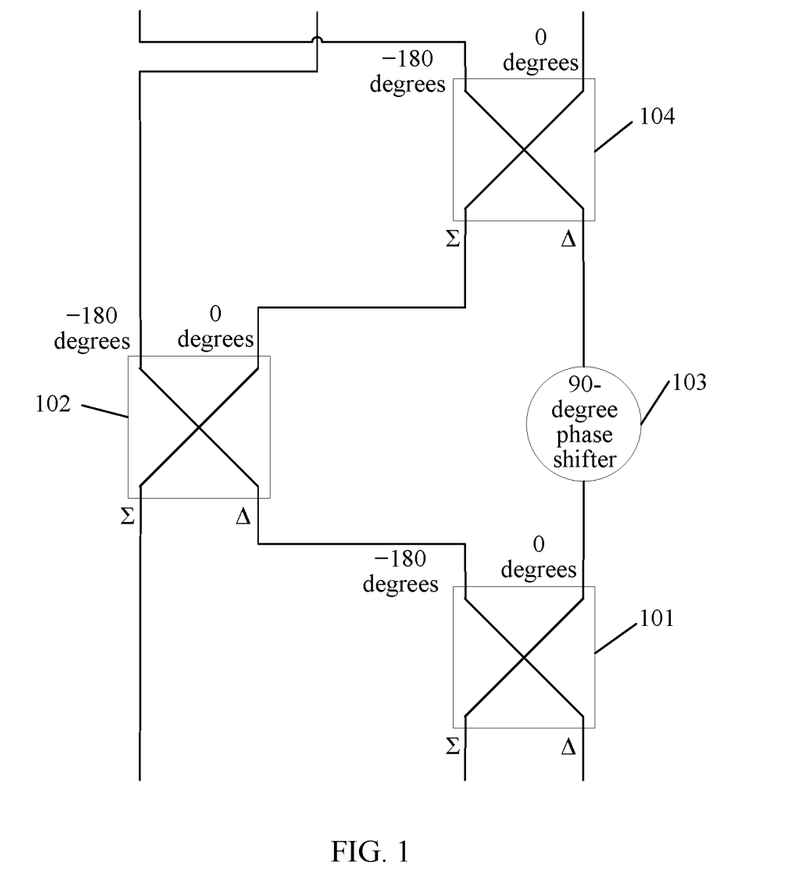
FIG. 1 is a circuit diagram of a beam forming network according to an embodiment of the present invention.

As shown in FIG. 1, an embodiment of the present invention provides a beam forming network that uses a 180-degree bridge as a major component. Referring to FIG. 1, the beam forming network includes a first 180-degree bridge for equal-power division 101, a 180-degree bridge for unequal-power division 102, a 90-degree phase shifter 103, and a second 180-degree bridge for equal-power division 104. The first 180-degree bridge for equal-power division 101, the 180-degree bridge for unequal-power division 102, and the second 180-degree bridge for equal-power division 104 separately have a sum input port, a difference input port, a straight-through port of the sum input port, and a coupling port of the sum input port The coupling port of the sum input port of the first 180-degree bridge for equal-power division 101 is connected to the difference input port of the 180-degree bridge for unequal-power division 102. The straight-through port of the sum input port of the first 180-degree bridge for equal-power division 101 is connected to an input port of the 90-degree phase shifter 103. An output port of the 90-degree phase shifter 103 is connected to the difference input port of the second 180-degree bridge for equal-power division 104. The straight-through port of the sum input port of the 180-degree bridge for unequal-power division 102 is connected to the sum input port of the second 180-degree bridge for equal-power division 104. Two input ports of the first 180-degree bridge for equal-power division 101 and the sum input port of the 180-degree bridge for unequal-power division 102 are configured to receive a signal from a base station transceiver. The coupling port of the sum input port of the 180-degree bridge for unequal-power division 102 and the two output ports of the second 180-degree bridge for equal-power division 104 are configured to feed an antenna array.

Figure 2:
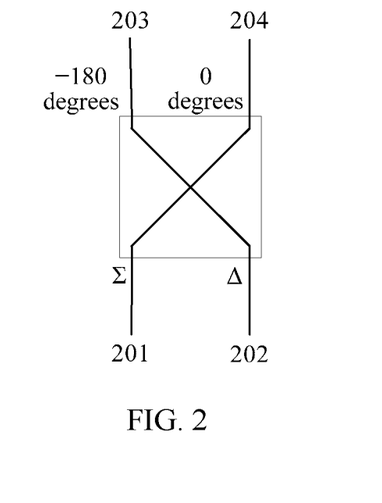
FIG. 2 is a circuit diagram of a 180-degree bridge according to an embodiment of the present invention.

FIG. 2 is a circuit diagram of a 180-degree bridge according to an embodiment of the present invention. As shown in FIG. 2, the 180-degree bridge is a passive 4-port network, including two input ports 201 and 202 and two output ports 203 and 204. Σ is used to denote the sum port 201 of the bridge, and A is used to denote the difference port 202 of the bridge. The port 203 is referred to as a coupling port of the sum port 201, and the port 204 is referred to as a straight-through port of the sum port 201. Furthermore, the port 204 is referred to as a coupling port of the difference port 202, and the port 203 is referred to as a straight-through port of the difference port 202.

The 180-degree bridge includes a 180-degree bridge for equal-power division and a 180-degree bridge for unequal-power division, where the 180-degree bridge for equal-power division is also generally referred to as a 3 dB 180-degree bridge. Generally, a power division ratio is used to define a relationship between powers of two output ports of a 180-degree bridge. The power division ratio is defined as a power ratio of output signals of a coupling port and a straight-through port that correspond to any input port when a signal is input at the input port. For the 180-degree bridge for equal-power division, when a signal is input at the sum port 201, a power ratio of output signals corresponding to the two output ports is 1:1, and a phase shift difference is 0 degrees (a 0-degree identifier at the output port 204 in FIG. 2 indicates the phase relationship). When a signal is input at the difference port 202, a power ratio of output signals corresponding to the two output ports is 1:1, and compared with a signal of the output port 204, a signal of the output port 203 has a phase delay of 180 degrees (a −180-degree identifier at the output port 203 in FIG. 2 indicates the phase relationship). For the 180-degree bridge for unequal-power division, assuming that a power division ratio is 1:2, when a signal is input at the sum port 201, a power ratio of output signals corresponding to the coupling port 203 and the straight-through port 204 is 1:2. When a signal is input at the difference port, a power ratio of output signals corresponding to the coupling port 204 and the straight-through port 203 is 1:2. A 180-degree bridge for unequal-power division and a 180-degree bridge for equal-power division have a consistent phase characteristic.

In the foregoing embodiment, optionally, a power division ratio of the 180-degree bridge for unequal-power division 102 may be 1:2 or 1:4, such that three beams are orthogonal to each other. In an actual system, to meet different requirements for beam sidelobe optimization, beam orthogonality, insertion loss, and the like, the power division ratio of the 180-degree bridge for unequal-power division 102 may be flexibly set.

Optionally, the foregoing components may be connected by using a transmission line or a microstrip having a coaxial structure.

Optionally, the foregoing beam forming network has three output ports, the antenna array may include three linear arrays, each linear array includes at least one antenna unit, and each output port of the beam forming network feeds one of the linear arrays.

In this embodiment of the present invention, the beam forming network that is used to form three fixed beams has a simple structure and is easy to fabricate.

Figure 3:
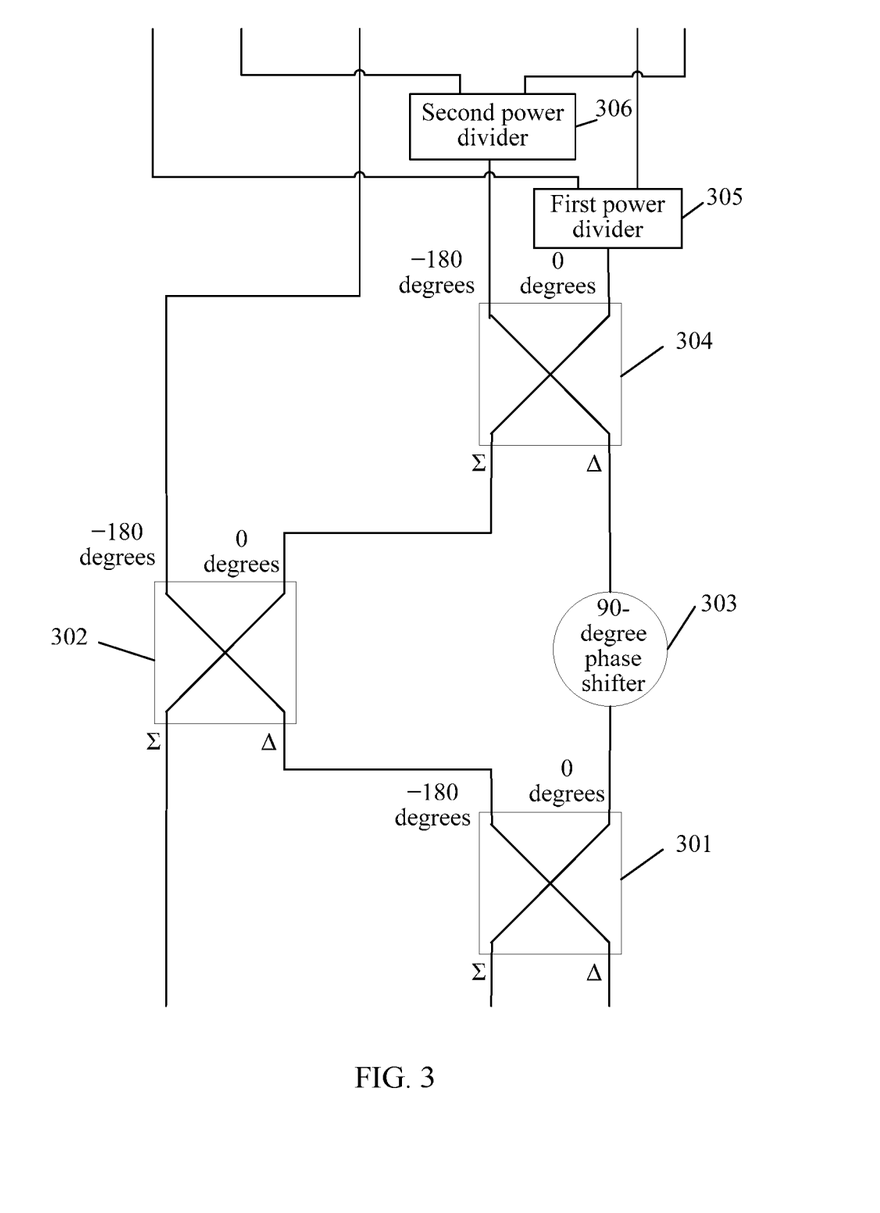
FIG. 3 is a circuit diagram of a beam forming network according to another embodiment of the present invention.

As shown in FIG. 3, an embodiment of the present invention provides another beam forming network. Two power dividers are added based on the beam forming network shown in FIG. 1. The beam forming network includes a first 180-degree bridge for equal-power division 301, a 180-degree bridge for unequal-power division 302, a 90-degree phase shifter 303, a second 180-degree bridge for equal-power division 304, a first power divider 305, and a second power divider 306.

A coupling port of a sum input port of the first 180-degree bridge for equal-power division 301 is connected to a difference input port of the 180-degree bridge for unequal-power division 302. A straight-through port of the sum input port of the first 180-degree bridge for equal-power division 301 is connected to an input port of the 90-degree phase shifter 303. An output port of the 90-degree phase shifter 303 is connected to a difference input port of the second 180-degree bridge for equal-power division 304. A straight-through port of a sum input port of the 180-degree bridge for unequal-power division 302 is connected to a sum input port of the second 180-degree bridge for equal-power division 304. A straight-through port of the sum input port of the second 180-degree bridge for equal-power division 304 is connected to an input port of the first power divider 305. A coupling port of the sum input port of the second 180-degree bridge for equal-power division 304 is connected to an input port of the second power divider 306. The first power divider 305 and the second power divider 306 both have two output ports. The output ports of the first power divider 305 and the second power divider 306 are configured to feed an antenna array. Two input ports of the first 180-degree bridge for equal-power division 301 and the sum input port of the 180-degree bridge for unequal-power division 302 are configured to receive a signal from a base station transceiver.

Optionally, power division ratios of the first power divider 305 and the second power divider 306 are 3:7, and a power division ratio of the 180-degree bridge for unequal-power division 202 may be 1:2, such that three beams are orthogonal to each other and effectively suppress a beam sidelobe. In an actual system, to meet different requirements for beam sidelobe optimization, beam orthogonality, insertion loss, and the like, the power division ratios of the first power divider 305, the second power divider 306, and the 180-degree bridge for unequal-power division 302 may be flexibly set.

A coupling port of the sum input port of the 180-degree bridge for unequal-power division 302, the two output ports of the first power divider 305, and the two output ports of the second power divider 306 are configured to feed the antenna array.

The foregoing beam forming network has five output ports. Optionally, the antenna array may include five linear arrays, each linear array includes at least one antenna unit, and each output port of the beam forming network feeds one of the linear arrays.

In this embodiment of the present invention, the beam forming network that is used to form three fixed beams has a simple structure and is easy to fabricate.

Figure 4:
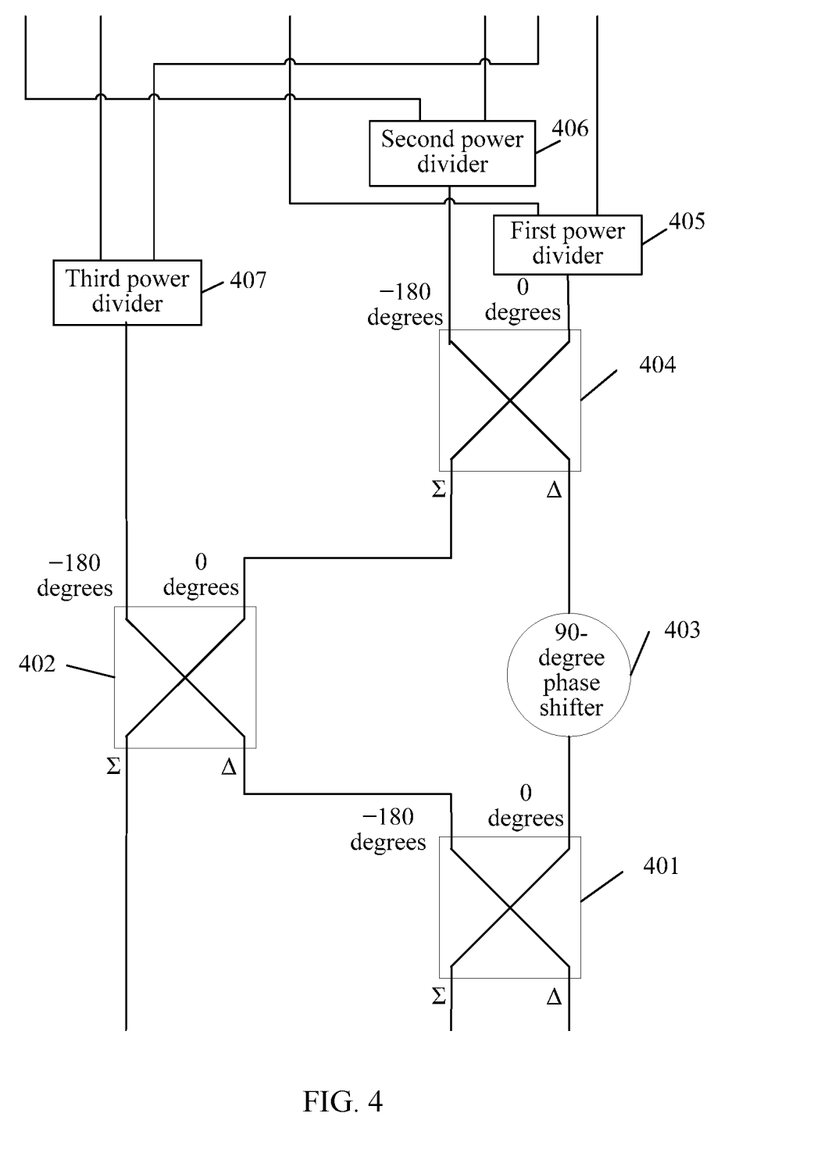
FIG. 4 is a circuit diagram of a beam forming network according to another embodiment of the present invention.

As shown in FIG. 4, an embodiment of the present invention provides another beam forming network. Three power dividers are added based on the beam forming network shown in FIG. 1. Referring to FIG. 4, the beam forming network includes a first 180-degree bridge for equal-power division 401, a 180-degree bridge for unequal-power division 402, a 90-degree phase shifter 403, a second 180-degree bridge for equal-power division 404, a first power divider 405, a second power divider 406, and a third power divider 407.

A coupling port of a sum input port of the first 180-degree bridge for equal-power division 401 is connected to a difference input port of the 180-degree bridge for unequal-power division 402. A straight-through port of the sum input port of the first 180-degree bridge for equal-power division 401 is connected to an input port of the 90-degree phase shifter 403. An output port of the 90-degree phase shifter 403 is connected to a difference input port of the second 180-degree bridge for equal-power division 404. A straight-through port of a sum input port of the 180-degree bridge for unequal-power division 402 is connected to a sum input port of the second 180-degree bridge for equal-power division 404. A straight-through port of the sum input port of the second 180-degree bridge for equal-power division 404 is connected to an input port of the first power divider 405. A coupling port of the sum input port of the second 180-degree bridge for equal-power division 404 is connected to an input port of the second power divider 406. A coupling port of the sum input port of the 180-degree bridge for unequal-power division 402 is connected to an input port of the third power divider 407. The first power divider 405, the second power divider 406, and the third power divider 407 separately have two output ports. The output ports of the first power divider 405, the second power divider 406, and the third power divider 407 are configured to feed an antenna array. Two input ports of the first 180-degree bridge for equal-power division 401 and the sum input port of the 180-degree bridge for unequal-power division 402 are configured to receive a signal from a base station transceiver.

Optionally, a power division ratio of the first power divider 405 and a power division ratio of the second power divider 406 may both be 1:4, a power division ratio of the third power divider 407 is 1:1, and a power division ratio of the 180-degree bridge for unequal-power division 402 may be 1:2, such that three beams are orthogonal to each other, and effectively suppress a beam sidelobe. In an actual system, to meet different requirements for beam sidelobe optimization, beam orthogonality, insertion loss, and the like, the power division ratios of the first power divider 405, the second power divider 406, the third power divider 407, and the 180-degree bridge for unequal-power division 402 may be flexibly set.

The two output ports of the first power divider 405, the two output ports of the second power divider 406, and the two output ports of the third power divider 407 are configured to feed the antenna array.

The foregoing beam forming network has six output ports. Optionally, the antenna array may include six linear arrays, each linear array includes at least one antenna unit, and each output port of the beam forming network feeds one of the linear arrays.

In this embodiment of the present invention, the beam forming network that is used to form three fixed beams has a simple structure and is easy to fabricate.

It should be noted that, in this embodiment of the present invention, the beam forming network may include more power dividers, and the antenna array may include more linear arrays.

Figure 5:
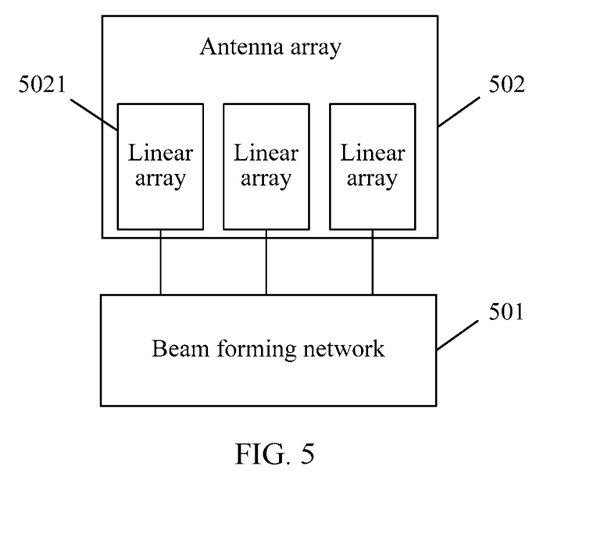
FIG. 5 is a structural block diagram of a base station antenna according to an embodiment of the present invention.

As shown in FIG. 5, an embodiment of the present invention further provides a base station antenna, including a beam forming network 501 according to the foregoing embodiments and an antenna array 502. The antenna array 502 includes multiple linear arrays 5021, each linear array 5021 includes at least one antenna unit, and each output port of the beam forming network 501 is configured to feed one of the linear arrays 5021.

Figure 6:
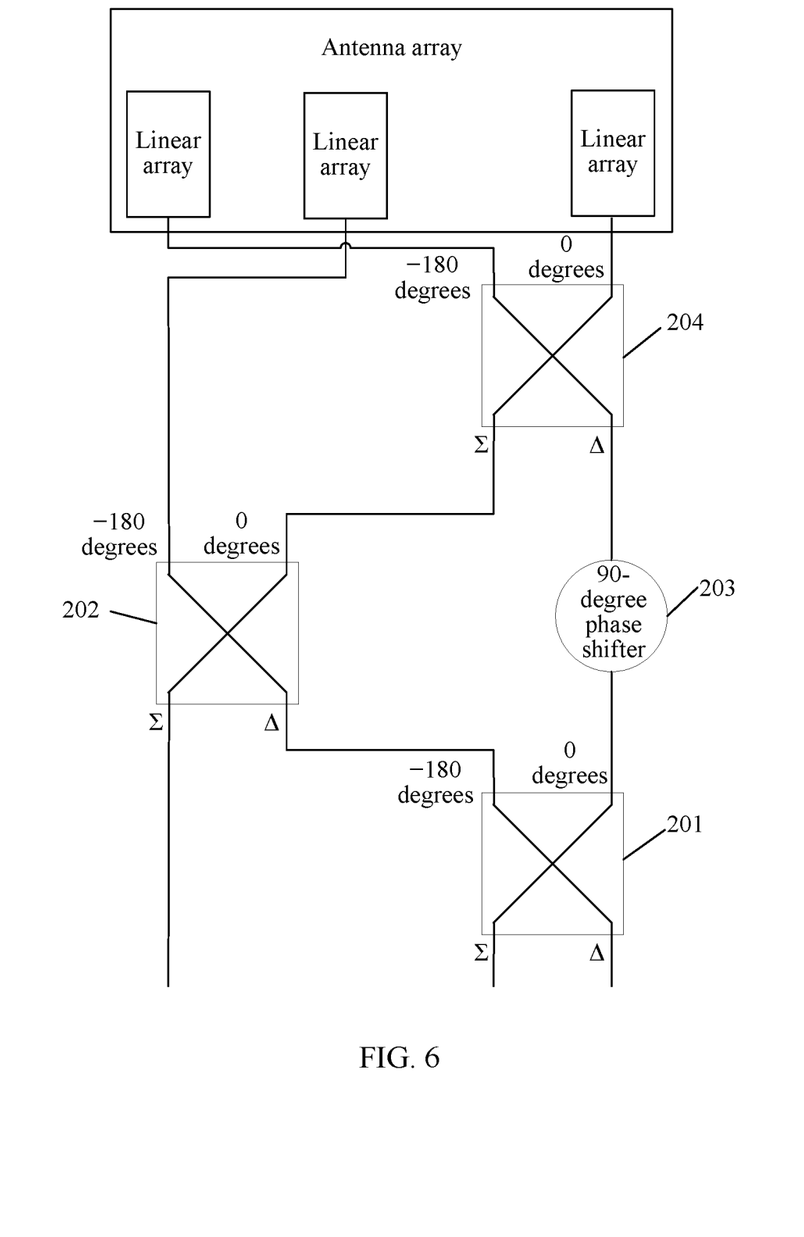
FIG. 6 is a structural block diagram of another base station antenna according to an embodiment of the present invention.
Figure 7:
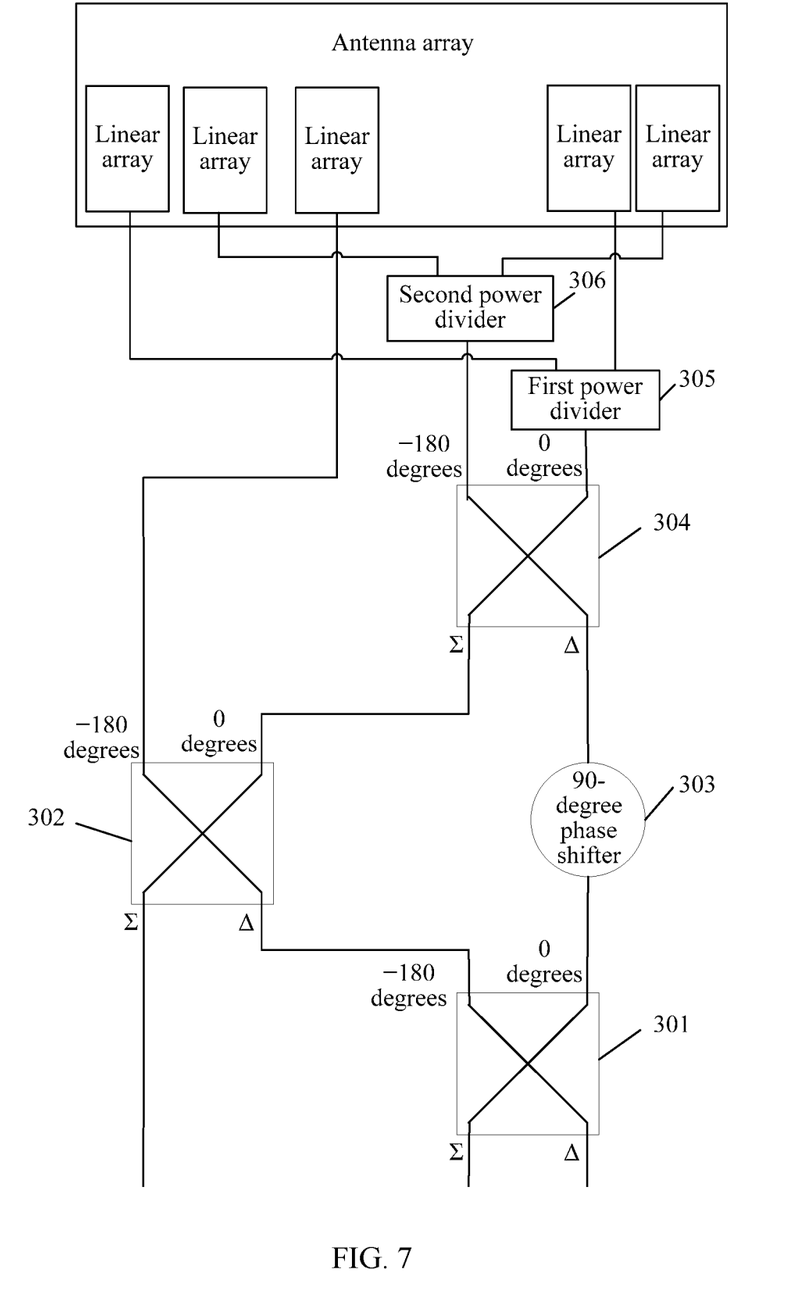
FIG. 7 is a structural block diagram of another base station antenna according to an embodiment of the present invention.
Figure 8:
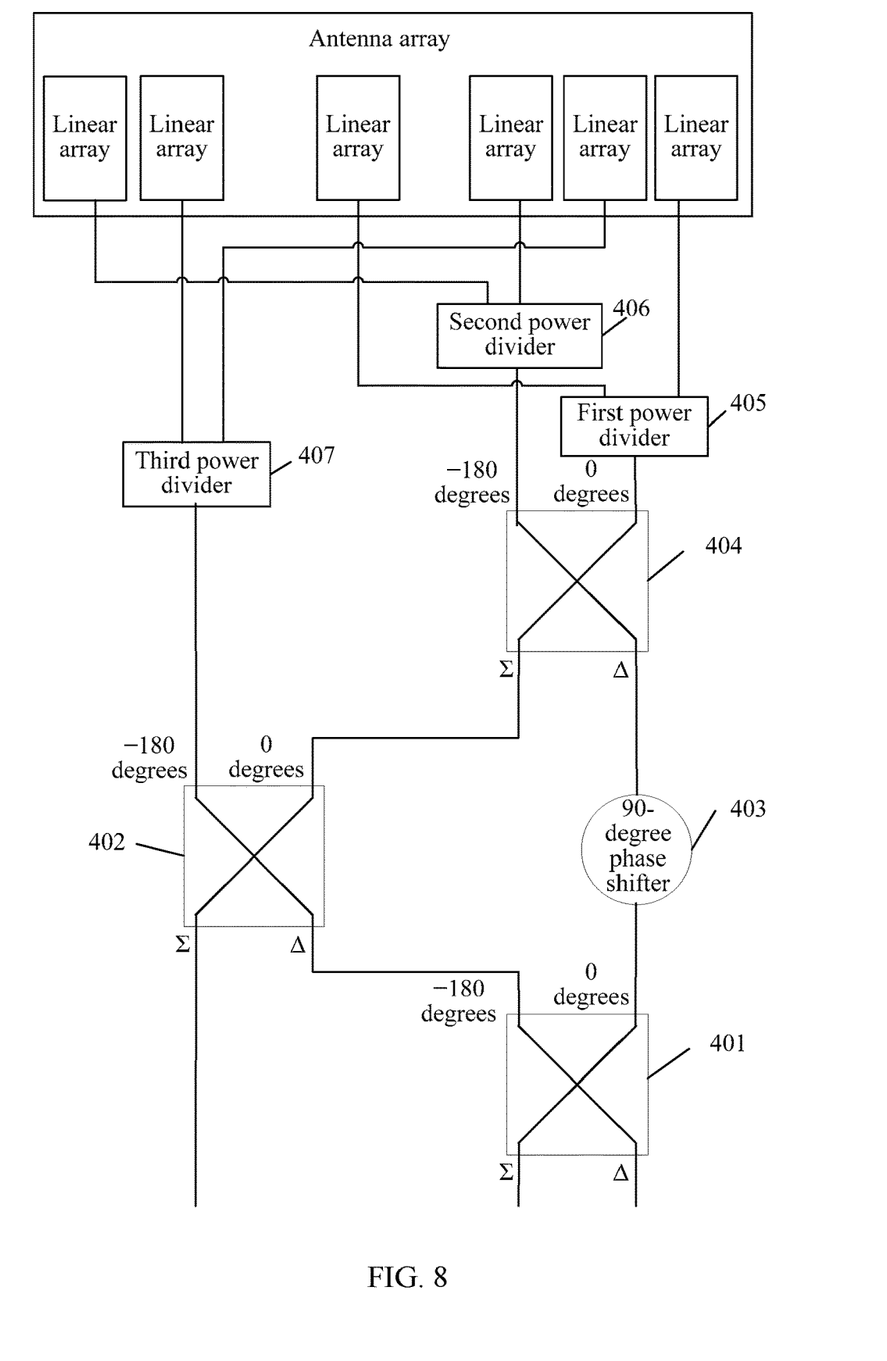
FIG. 8 is a structural block diagram of another base station antenna according to an embodiment of the present invention.

FIG. 5 merely shows three schematic linear arrays. A quantity of linear arrays is not limited in the present invention, and may be, for example, 3, 5 or 6, and corresponding structural block diagrams are respectively shown in FIG. 6, FIG. 7, and FIG. 8. Multiple linear arrays are sequentially arranged at equal intervals.

In this embodiment of the present invention, the base station antenna that is used to form three fixed beams has a simple structure and is easy to fabricate.

The foregoing descriptions are merely exemplary embodiments of the present invention, and are not intended to limit the protection scope of the present invention. Any modification, equivalent replacement, or improvement made without departing from the spirit and principle of the present invention shall fall within the protection scope of the present invention. Additionally, statements made herein characterizing the invention refer to an embodiment of the invention and not necessarily all embodiments.

What is claimed is:

1. A beam forming network, comprising:
   a first 180-degree bridge for equal-power division;
   a 180-degree bridge for unequal-power division;
   a 90-degree phase; and
   a second 180-degree bridge for equal-power division;
   wherein the first 180-degree bridge for equal-power division, the 180-degree bridge for unequal-power division, and the second 180-degree bridge for equal-power division each have a sum input port, a difference input port, a straight-through port of the sum input port, and a coupling port of the sum input port;
   wherein the coupling port of the sum input port of the first 180-degree bridge for equal-power division is connected to the difference input port of the 180-degree bridge for unequal-power division, the straight-through port of the sum input port of the first 180-degree bridge for equal-power division is connected to an input port of the 90-degree phase shifter, an output port of the 90-degree phase shifter is connected to the difference input port of the second 180-degree bridge for equal-power division, and the straight-through port of the sum input port of the 180-degree bridge for unequal-power division is connected to the sum input port of the second 180-degree bridge for equal-power division; and
   wherein two input ports of the first 180-degree bridge for equal-power division and the sum input port of the 180-degree bridge for unequal-power division are configured to receive a signal from a base station transceiver, and the coupling port of the sum input port of the 180-degree bridge for unequal-power division and two output ports of the second 180-degree bridge for equal-power division are configured to feed an antenna array.

2. The beam forming network according to claim 1, wherein a power division ratio of the 180-degree bridge for unequal-power division is 1:2 or 1:4.

3. The beam forming network according to claim 1, wherein the beam forming network further comprises a first power divider and a second power divider, wherein the straight-through port of the sum input port of the second 180-degree bridge for equal-power division is connected to an input port of the first power divider, the coupling port of the sum input port of the second 180-degree bridge for equal-power division is connected to an input port of the second power divider, the first power divider and the second power divider each have two output ports, and the output ports of the first power divider and the second power divider are configured to feed the antenna array.

4. The beam forming network according to claim 3, wherein power division ratios of the first power divider and the second power divider are 3:7, and a power division ratio of the 180-degree bridge for unequal-power division is 1:2.

5. The beam forming network according to claim 1, wherein the beam forming network further comprises a first power divider, a second power divider, and a third power divider, wherein the straight-through port of the sum input port of the second 180-degree bridge for equal-power division is connected to an input port of the first power divider; the coupling port of the sum input port of the second 180-degree bridge for equal-power division is connected to an input port of the second power divider; the coupling port of the sum input port of the 180-degree bridge for unequal-power division is connected to an input port of the third power divider; the first power divider, the second power divider, and the third power divider each have two output ports, and the output ports of the first power divider, the second power divider, and the third power divider are configured to feed the antenna array.

6. The beam forming network according to claim 5, wherein power division ratios of the first power divider and the second power divider are both 1:4, a power division ratio of the third power divider is 1:1, and a power division ratio of the 180-degree bridge for unequal-power division is 1:2.

7. A base station antenna, comprising:
   a beam forming network, comprising:
      a first 180-degree bridge for equal-power division;
      a 180-degree bridge for unequal-power division;
      a 90-degree phase shifter; and
      a second 180-degree bridge for equal-power division;
      wherein the first 180-degree bridge for equal-power division, the 180-degree bridge for unequal-power division, and the second 180-degree bridge for equal-power division each have a sum input port, a difference input port, a straight-through port of the sum input port, and a coupling port of the sum input port;
      wherein the coupling port of the sum input port of the first 180-degree bridge for equal-power division is connected to the difference input port of the 180-degree bridge for unequal-power division, the straight-through port of the sum input port of the first 180-degree bridge for equal-power division is connected to an input port of the 90-degree phase shifter, an output port of the 90-degree phase shifter is connected to the difference input port of the second 180-degree bridge for equal-power division, and the straight-through port of the sum input port of the 180-degree bridge for unequal-power division is connected to the sum input port of the second 180-degree bridge for equal-power division; and
      wherein two input ports of the first 180-degree bridge for equal-power division and the sum input port of the 180-degree bridge for unequal-power division are configured to receive a signal from a base station transceiver, and the coupling port of the sum input port of the 180-degree bridge for unequal-power division and two output ports of the second 180-degree bridge for equal-power division are configured to feed an antenna array; and
   the antenna array, wherein the antenna array comprises multiple linear arrays, each linear array comprises at least one antenna unit, and each output port of the beam forming network feeds one of the linear arrays.

* * * * *

UNITED STATES PATENT AND TRADEMARK OFFICE
CERTIFICATE OF CORRECTION

PATENT NO. : 10,381,745 B2
APPLICATION NO. : 15/416941
DATED : August 13, 2019
INVENTOR(S) : Geng et al.

Page 1 of 1

It is certified that error appears in the above-identified patent and that said Letters Patent is hereby corrected as shown below:

In the Claims

Claim 1, Column 7, Line 26: "a 90-degree phase; and" should read -- a 90-degree phase shifter; and --.

Signed and Sealed this
Tenth Day of March, 2020

Andrei Iancu
*Director of the United States Patent and Trademark Office*